April 14, 1959 E. M. KELLY 2,881,922
FLOCCULATION
Filed Oct. 13, 1955 3 Sheets-Sheet 3
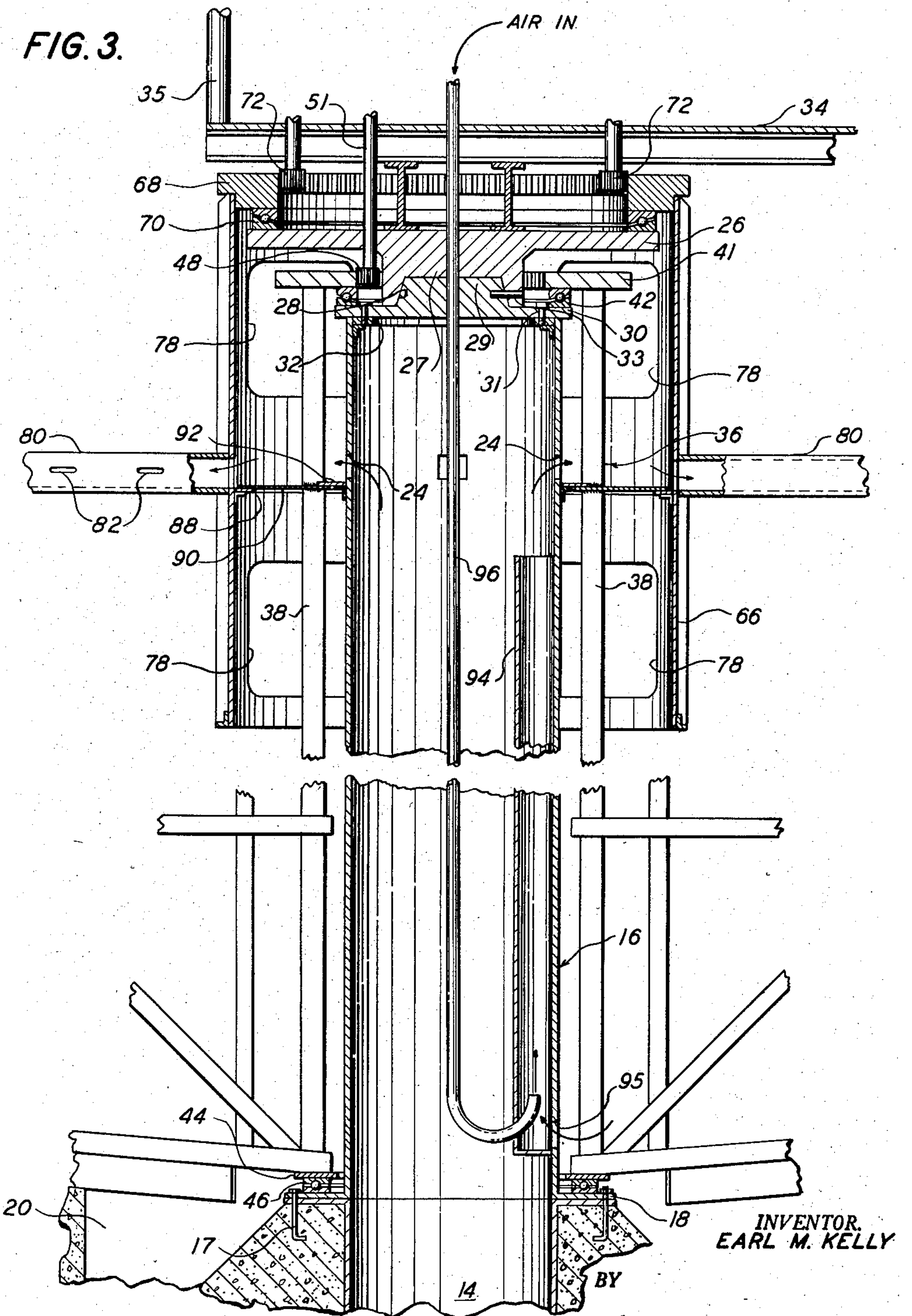
INVENTOR.
EARL M. KELLY
BY
Christie, Parker & Hale
ATTORNEYS FLOCCULATION
Filed Oct. 13, 1955
3 Sheets-Sheet 1
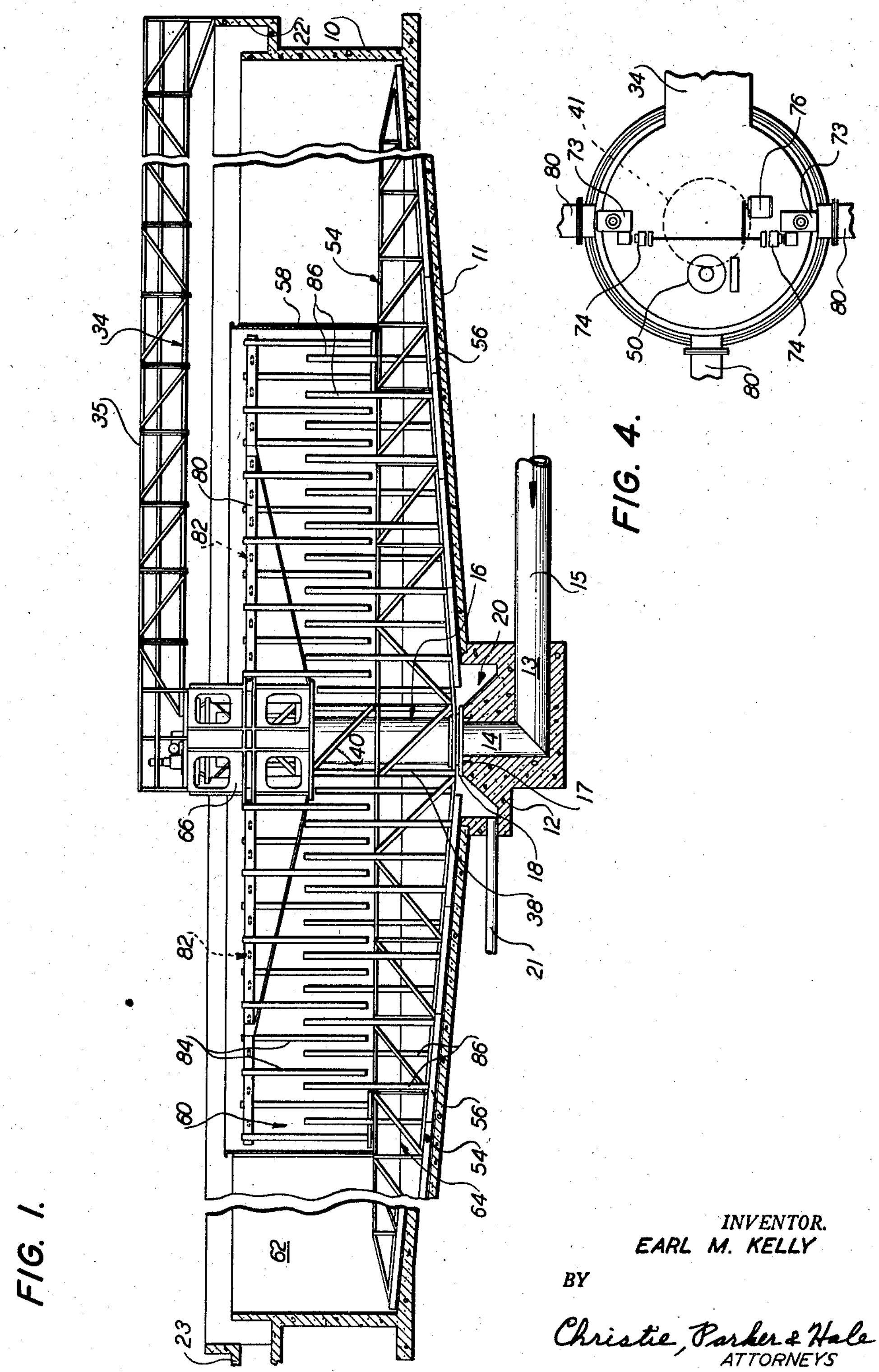
INVENTOR.
EARL M. KELLY
BY
Christie, Parker & Hale
ATTORNEYS FLOCCULATION
Filed Oct. 13, 1955 3 Sheets-Sheet 2
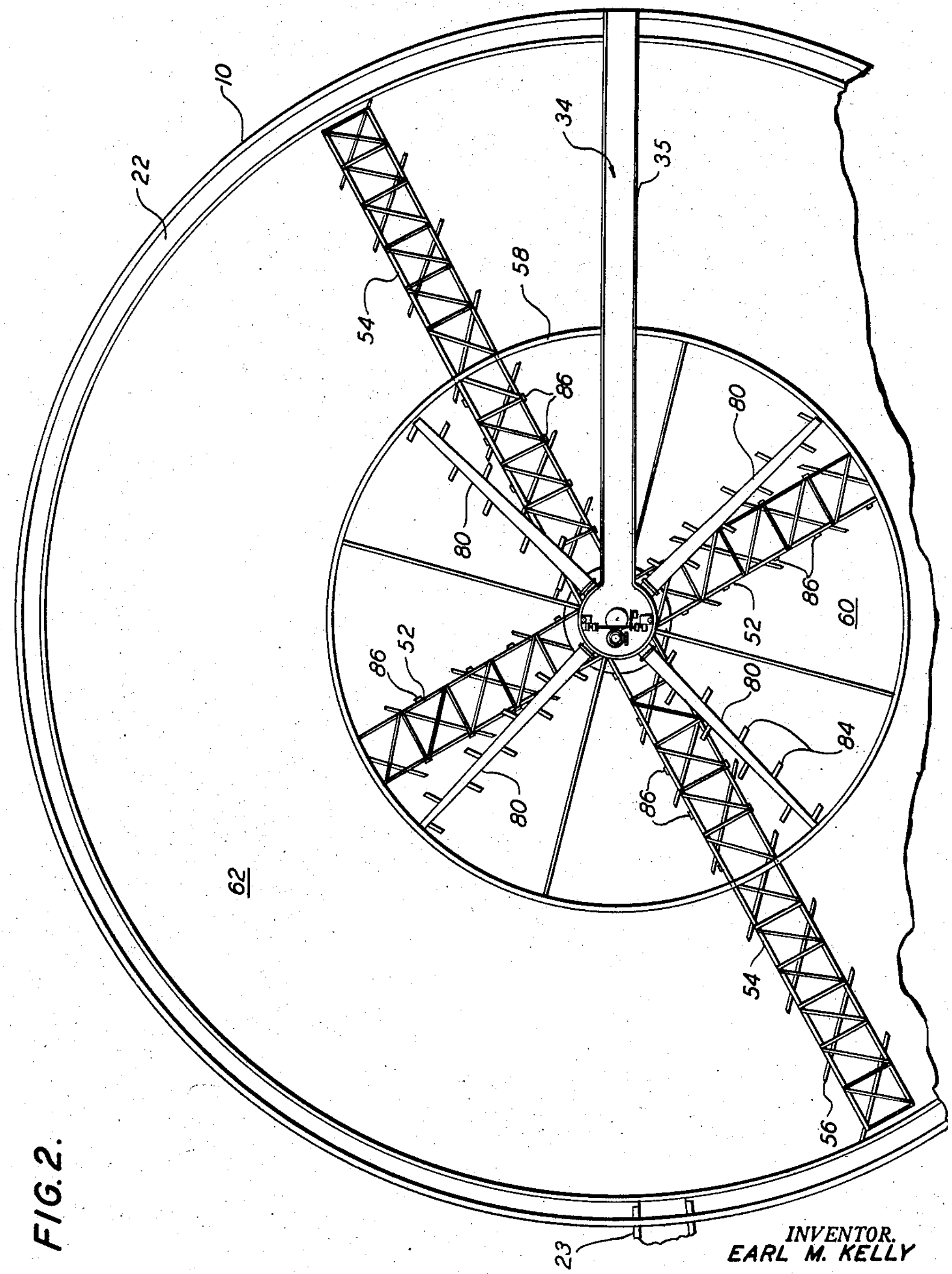
INVENTOR.
EARL M. KELLY
BY
Christie, Parker & Hale
ATTORNEYS United States Patent Office 2,881,922

Patented Apr. 14, 1959

2,881,922

FLOCCULATION

Earl M. Kelly, Hillsborough, Calif., assignor to Process Engineers Incorporated, San Mateo, Calif., a corporation of California Application October 13, 1955, Serial No. 540,274

7 Claims. (Cl. 210—520)

This invention relates to apparatus for removing solids from a liquid suspension by flocculation and settlement.

Prior to this invention flocculation and settlement apparatus has included a tank divided into a flocculation compartment and a settlement compartment by a baffle spaced from the tank bottom, the two compartments communicating below the baffle. With this prior art equipment solids are removed from a liquid suspension by introducing the suspension into the flocculation compartment at a confined location, normally in the center of the flocculation compartment. The solids in the suspension undergo flocculation as the suspension flows from the flocculation compartment to the settling compartment, and the flocculated solids settle to the bottom of the tank from where they are raked to a discharge.

One disadvantage of the previously available flocculation and sedimentation apparatus is that much of the flocculation compartment is merely a "dead zone," that is, a volume which serves no useful purpose due to the "short circuiting" of the suspension from the inlet in the flocculation compartment to the passage way connecting the flocculation and sedimentation compartments. With the prior devices the liquid suspension is not retained in the flocculation compartment for the maximum possible time, thus resulting in either inefficient flocculation and settling of the solids, or else requiring the use of unnecessarily large and correspondingly expensive equipment.

This invention provides apparatus which overcomes the above disadvantage by providing flocculation and sedimentation apparatus in which the flocculation compartment is used with maximum efficiency, resulting in virtually no "dead zone."

Briefly, this invention includes a tank which has a discharge in its bottom for settled solids. An upright baffle is disposed in the tank and spaced above the bottom thereof to divide the tank into a flocculation compartment and a settling compartment, the two compartments communicating with each other above the tank bottom and below the baffle. Raking means are provided in the tank for moving settled solids along the tank bottom to the discharge in the tank, and means are provided for removing from an upper portion of the settling compartment liquid from which suspended solids have been settled. An elongated, movable, hollow distributor arm is disposed in an upper portion of the flocculation compartment and has a plurality of longitudinally spaced outlets for distributing a liquid suspension to a plurality of points across the upper portion of the flocculation compartment. Means are provided for introducing the suspension to the distributor arm and means are also provided for moving the distributor arm over substantially the entire area of the flocculation compartment as the suspension flows out of the openings in the distributor arm.

In the preferred form of the invention a first set of upright paddles, laterally spaced from each other, are attached at their upper ends to the distributor arm and extend downwardly therefrom in the flocculation compartment toward the raking means.

The presently preferred embodiment of the invention also includes a second set of laterally spaced upwardly extending paddles attached at their lower ends to the raking means to mesh with the first set of paddles when the distributor arm is moved.

These and other aspects of the invention will be fully understood from the following detailed description taken in conjunction with the accompanying drawings in which:

Fig. 1 is a fragmentary sectional elevation of the presently preferred form of the invention;

Fig. 2 is a fragmentary plan view of the apparatus shown in Fig. 1;

Fig. 3 is a fragmentary sectional elevation of the mechanism in the center of the apparatus used to move the distributor arms and the raking means; and Fig. 4 is a fragmentary plan view of the mechanism shown in Fig. 3.

Referring to Figs. 1 and 2, an upright cylindrical tank 10, having a gently sloping inverted frusto-conical bottom 11, rests on a central foundation 12. The foundation has a horizontal bore 13 which joins the lower end of a vertical bore 14 in the center of the foundation. The outer end of horizontal bore 13 receives an influent pipe 15 into which a liquid suspension (not shown) of solids is introduced into the bottom of a vertical influent column 16 secured at its lower end around the vertical bore 14 by means of anchor bolts 17 extending up from the foundation through an outwardly extending flange 18 on the influent column. An annular sludge pocket 20 in the upper surface of the base receives settled solids which are carried away through a sludge discharge pipe 21 connected to the bottom of the sludge pocket.

A conventional effluent launder 22 is formed around the periphery of the tank for receiving clarified effluent. The upper edge of the tank wall serves as an overflow weir for clarified effluent and establishes the water line operating level for the liquid suspension in the tank. A horizontal effluent pipe 23 is connected to the bottom of the launder for carrying away effluent.

Referring to Fig. 3, a plurality of openings 24 are provided in the influent column adjacent its upper end. A circular yoke 26, having a downwardly extending projection 27 with a circular and tapered recess 28 in its bottom surface, rests on a boss 29 tapered to fit into the recess 28. An outwardly turned flange 30 formed at the lower end of the boss is secured by bolts 31 extending through the flange 30 and an inwardly extending flange 32 welded to the upper end of the influent column. A horizontal pin 33 is press fitted into registered openings in the sides of the projection 27 and the boss 29 to prevent relative movement of those two elements. A conventional walkway 34 with a handrail 35 extends from the edge of the tank to the yoke to provide ready access to the subsequently described equipment mounted on the yoke.

A cage 36, including a plurality of vertical rods 38 disposed around the influent column and held together by suitable lateral cross-bracing 40 is welded at its upper end to a cage internal ring gear 41 which is supported for rotation on an annular ball bearing 42 disposed on the outer periphery of the flange 30. A thrust ring 44 is welded to the lower end of the cage and rides on an annular ball bearing 46 disposed on the upper surface of flange 18 at the bottom of the influent column. The cage is rotated about its vertical axis by means of a driving gear 48 which engages the cage ring gear and which is driven by a motor 50 (see Fig. 4) through a shaft 51.

Referring to Figs. 1 and 2, a pair of short, radially extending sludge raking arms 52 are welded at their inner ends to the bottom of the cage on diametrically opposed sides and extend over the bottom of the tank approximately half-way to the tank wall. A pair of long, radially extending sludge raking arms 54 are attached at their inner ends to the bottom of the cage on diametrically opposed sides and are spaced at equal angles from the short arms. The long arms terminate adjacent the tank wall. A plurality of blades 56 are attached to the bottom of both the long and short raking arms to scrape the tank bottom as the arms are rotated with the cage. The blades are each set at an angle to the longitudinal axis of the respective arm to which they are attached to scrape settled solids inwardly toward the sludge pocket as the arms are rotated in a clockwise direction as viewed in Fig. 2.

An annular upright baffle 58 is welded at its lower end to the upper part of each of the sludge arms so that the bottom of the baffle is spaced above the tank bottom and the top of the baffle projects slightly above the water line established by the upper edge of the tank wall. The baffle divides the tank into inner or flocculation compartment 60 surrounded by an annular or outer sedimentation compartment 62, the two compartments communicating with each other through the space 64 under the baffle.

Referring to Figs. 3 and 4, an upright cylindrical drum 66 is coaxially disposed around the cage and spaced therefrom. An inwardly extending internal ring gear 68 welded to the upper end of the drum supports the drum for rotation about a vertical axis by resting on an annular ball bearing 70 which is carried by the upper surface of the yoke 26. The ring gear 68 is driven by a pair of diametrically opposed pinion gears 72, each pinion gear being driven through a separate worm gear reducer unit 73 powered by a separate fluid coupling unit 74 which in turn is powered by an electric motor 76.

The lower end of the drum projects below the water line, and the drum is provided with a plurality of access openings 78 both above and below the water line. Four equal angularly spaced hollow distributor arms 80 are attached at their inner ends to the drum exterior just below the water line and each distributor arm extends radially in a horizontal plane to terminate adjacent the baffle. Each of the distributor arms is adapted to rotate in a clockwise direction as viewed in Fig. 2 and each distributor arm has a plurality of laterally spaced openings 82 on its trailing side. A first set of a plurality of downwardly extending laterally spaced mixing paddles 84 are attached at their upper ends to each of the distributor arms and terminate just above the top of the raking arms. The first set of paddles are set in a louver arrangement, i.e. with their flat sides at an angle to the longitudinal axis of the respective distributor arm to which they are attached, to deflect the liquid suspension toward the center of the tank as the distributor arms are rotated in a clockwise direction as viewed in Fig. 2. A second set of a plurality of laterally spaced vertical mixing paddles 86 are attached at their lower ends to each of short raking arms and to the portion of each of the long raking arms underlying the flocculation compartment, each of the second set of paddles being spaced so that they mesh with the first set as the distributor arm rotates at a speed different from that of the raking arms.

An annular, inwardly extending, horizontal lip 88 is welded to the drum interior just below the point where each distributor arm enters the drum. The outer periphery of a horizontal annular plate 90 is adapted to rotate with the cage and to make a sliding fit on top of the lip 88. The annular plate 90 is pierced by each of the rods 38 which make up the cage and the plate is welded to the rods to form a fluid-tight seal therewith. The inner periphery of the annular plate 90 extends toward the influent column and slides against the bottom of an outwardly extending annular horizontal lip 92 welded to the influent column just below the outlets 24 in the influent column. Thus, the two lips and the annular plate on the cage form a sliding seal between the influent column and the drum, permitting the drum and cage to rotate about the influent column at different speeds and directing liquid to flow from the outlets at the upper end of the influent column out into the distributor arms.

A vertical air lift column 94 is welded to the interior of the influent column. The lower end of the air lift column terminates just above the lower end of the influent column which is provided with an opening 95 adjacent its lower end which opens into the air lift column. An air supply line 96 extends down through the yoke and the influent column to enter the air lift column just above the opening 95 in the influent column. The line 96 is adapted to be connected to an air supply line (not shown). The upper end of the air lift column is open so that as air is supplied to the air lift column liquid suspension is drawn in through the opening 95 and discharged out the upper end of the air lift column. With this arrangement flocculated solids are picked up and recirculated out the distributor arms to provide a seeding action for the fresh incoming liquid suspension.

In the operation of the apparatus the motor 50 is driven so that the cage and raking arms are rotated in a clockwise direction as viewed in Fig. 2 at a relatively slow speed. The motor 76 is actuated to drive the distributor arms in a clockwise direction as viewed in Fig. 2 at a substantially higher speed than that of the rake arms. The difference in speed between the distributor arms and the rake arms varies with the type of suspension being treated, but a speed ratio of the distributor arms to the raking arms of about 10 to 1 is well suited for most suspensions.

The suspension to be treated is introduced through the influent pipe, flows up the influent column, out the openings in the influent column, and out through the rotating distributor arms to be discharged from the openings in the distributor arms so that a uniform layer of incoming suspension is laid down over the entire upper surface of the flocculation compartment. The suspension passes uniformly down into the flocculation compartment where it is agitated as the paddles on the distributor arms and raking arms mesh due to the difference of speed of the two sets of arms. The angle at which the distributor arm paddles are set deflect the suspension inwardly so that thorough mixing is achieved. The suspension finally passes under the baffle and into the thickening and sedimentation zones when the flocculated particles settle to the bottom of the tank. The raking arm blades move the settled solids into the sludge pocket from which they are carried by sludge discharge pipe.

During the above operation, the air lift is operated to recirculate some of the suspension and solids which have been flocculated in the flocculation compartment. This recirculated material passes out through the distributor arms and aids in rapid and effective flocculation by seeding the fresh incoming suspension.

As can be seen from the above description the entire cross-sectional area of the flocculation compartment is utilized, the incoming suspension being distributed over the entire surface of the compartment and compelled to flow in a generally downward direction, so that the entire flocculation zone is active in bringing about flocculation of the solid particles.

I claim:

1. Apparatus for removing solids from a liquid suspension by flocculation and settlement comprising a tank having a discharge for settled solids and adapted to contain a pool of liquid, an upright baffle disposed in the tank above the bottom thereof and dividing it into a flocculation compartment and a settling compartment communicating with each other above the tank bottom and below the baffle and the surface of the pool, movable raking means extending above the bottom for moving settled solids to the tank discharge, overflow means for removing liquid from which suspended solids have been settled from the pool in an upper portion of the settling compartment, an elongated movable hollow distributor arm disposed in an upper portion of the flocculation compartment, the distributor arm having a plurality of longitudinally spaced outlets for distributing the liquid suspension to a plurality of points across the upper portion of the flocculation compartment, means for introducing the suspension to the hollow distributor arm, first means for moving the distributor arm over substantially the entire area of the flocculation compartment, and separate second means for moving the raking means over the bottom of the tank.

2. In apparatus for removing solids from a liquid suspension by flocculation and settlement and having a tank with a discharge for settled solids and adapted to contain a pool of the suspension, an upright annular baffle disposed in the tank above the bottom thereof and dividing it into an inner compartment and an outer annular compartment communicating with each other above the tank bottom and below the baffle and the upper surface of the pool, movable raking means extending above the bottom for moving settled solids to the discharge from the tank and overflow means for removing liquid from which suspended solids have been settled from the pool in an upper portion of the outer annular compartment and for determining the level of the upper surface of the pool, the combination which comprises a hollow distributor arm extending outwardly in an upper portion of the inner compartment adjacent the upper surface of the pool and rotatable about an upright axis and having a plurality of outlets at different distances from the axis for distributing the liquid suspension to a plurality of points across the upper portion of the inner compartment, means for introducing the suspension to the hollow distributor arm, first means for rotating the distributor arm around the distributor arm axis, and separate second means for moving the raking means over the bottom of the tank.

3. In apparatus for removing solids from a liquid suspension by flocculation and settlement and having a tank for containing a pool of the liquid in which the settlement occurs with a discharge for settled solids in the lower portion thereof, an upright annular baffle disposed in the tank above the bottom thereof and dividing it into an inner compartment and an outer annular compartment communicating with each other above the tank bottom and below the baffle and the top of the pool, movable raking means extending above the bottom under both compartments for moving settled solids to the discharge from the tank and means for removing liquid from which suspended solids have been settled from an upper portion of the pool in the outer annular compartment, the combination which comprises a hollow distributor arm extending outwardly in an upper portion of the inner compartment adjacent the top of the pool and rotatable about an upright axis and having a plurality of outlets at different distances from the axis for distributing the liquid suspension to a plurality of points across the upper portion of the inner compartments, means for introducing the suspension to the hollow distributor arm, a plurality of upright paddles spaced from each other and attached to the distributor arm and extending downwardly therefrom in the pool in the inner compartment toward the raking means, first means for rotating the distributor arm and the attached paddles around the distributor arm axis, and separate second means for moving the raking means over the bottom of the tank.

4. In apparatus for removing solids from a liquid suspension by flocculation and settlement in a pool of the liquid and having a tank containing the pool of liquid with a discharge adjacent the bottom for settled solids, an upright annular baffle disposed in the tank above the bottom thereof and dividing it into an inner compartment and an outer annular compartment communicating with each other above the tank bottom and below the baffle and the top of the pool, raking means extending above the bottom in the pool under both compartments for moving settled solids to the discharge from the tank and means for removing liquid from which suspended solids have been settled from the pool in an upper portion of the outer annular compartment, the combination which comprises a hollow distributor arm extending outwardly in an upper portion of the inner compartment adjacent the top of the pool and rotatable about an upright axis and having a plurality of outlets at different distances from the axis for distributing the liquid suspension to a plurality of points across the upper portion of the inner compartment, means for introducing the suspension to the hollow distributor arm, a first set of upright paddles spaced from each other and attached to the distributor arm and extending downwardly therefrom in the pool in the inner compartment toward the raking means, a second set of upwardly extending paddles attached to the raking means to mesh with the first set of paddles, and means for rotating the distributor arm and the attached paddles around the distributor arm axis.

5. In apparatus for removing solids from a liquid suspension by flocculation and settlement in a pool of the liquid and having a tank in which the pool is retained with a discharge for settled solids in a lower portion of the tank, an upright annular baffle disposed in the tank above the bottom thereof and dividing it into an inner compartment and an outer annular compartment communicating with each other above the tank bottom and below the baffle and the top of the pool, raking means extending in the pool above the bottom under both compartments for moving settled solids to the discharge from the tank and means for removing liquid from which suspended solids have been settled from the pool in an upper portion of the outer annular compartment, the combination which comprises a hollow distributor arm extending outwardly in an upper portion of the inner compartment adjacent the top of the pool and rotatable about an upright axis and having a plurality of outlets at different distances from the axis for distributing the liquid suspension to a plurality of points across the upper portion of the inner compartment, means for introducing the suspension to the hollow distributor arm, means for recirculating a portion of the suspension within the tank through the distributor arm, a plurality of upright paddles spaced from each other and attached to the distributor arm and extending downwardly therefrom in the pool in the inner compartment toward the raking means, and means for rotating the distributor arm and the attached paddles around the distributor arm axis.

6. In apparatus for removing solids from a liquid suspension by flocculation and settlement in a pool of the liquid and having a tank for retaining said pool with a discharge for settled solids in a lower portion of the tank, an upright annular baffle disposed in the tank above the bottom thereof and dividing it into an inner compartment and an outer annular compartment communicating with each other above the tank bottom and below the baffle and the top of the pool, raking means extending above the bottom under both compartments for moving settled solids to the discharge from the tank and means for removing liquid from which suspended solids have been settled from the pool in an upper portion of the outer annular compartment, the combination which comprises a hollow distributor arm extending outwardly in an upper portion of the inner compartment adjacent the top of the pool and rotatable about an upright axis and having a plurality of outlets at different distances from the axis for distributing the liquid suspension to a plurality of points across the upper portion of the inner compartment, means for introducing the suspension to the hollow distributor arm, a plurality of upright paddles spaced from each other and attached to the distributor arm in a louver arrangement and extending downwardly therefrom in the pool in the inner compartment toward the raking means, and means for rotating the distributor arm and the attached paddles around the distributor arm axis.

7. In apparatus for removing solids from a liquid suspension by flocculation and settlement in a pool of the liquid and having a tank for retaining the pool with a discharge for settled solids, an upright annular baffle disposed in the tank above the bottom thereof and dividing it into an inner compartment and an outer annular compartment communicating with each other above the tank bottom and below the baffle and the top of the pool, movable raking means extending in the pool above the bottom under both compartments for moving settled solids to the discharge from the tank and means for removing liquid from which suspended solids have been settled from an upper portion of the pool in the outer annular compartment, the combination which comprises an elongated hollow distributor arm extending outwardly in an upper portion of the inner compartment adjacent the top of the pool and rotatable about an upright axis and having a plurality of longitudinally spaced outlets, all of the outlets opening in a generally horizontal direction along one edge for distributing the liquid suspension to a plurality of points across the upper portion of the inner compartment in a direction generally perpendicular to the longitudinal axis of the distributor arm, means for rotating the distributor arm around the distributor arm axis in direction so that the edge of the distributor arm with the openings is the trailing edge, and means for introducing the suspension to the hollow distributor arm.

References Cited in the file of this patent

UNITED STATES PATENTS

| | | |
|---|---|---|
| 2,263,168 | Dorr et al. | Nov. 18, 1941 |
| 2,267,516 | Adams | Dec. 23, 1941 |
| 2,525,842 | Thompson et al. | Oct. 17, 1950 |
| 2,568,452 | Kelly et al. | Sept. 18, 1951 |
| 2,611,646 | Knowles | Sept. 23, 1952 |
| 2,651,615 | Kelly et al. | Sept. 8, 1953 |
| 2,669,357 | Kivell et al. | Feb. 16, 1954 |

FOREIGN PATENTS

| | | |
|---|---|---|
| 709,174 | Great Britain | May 19, 1954 |